Figure 1:
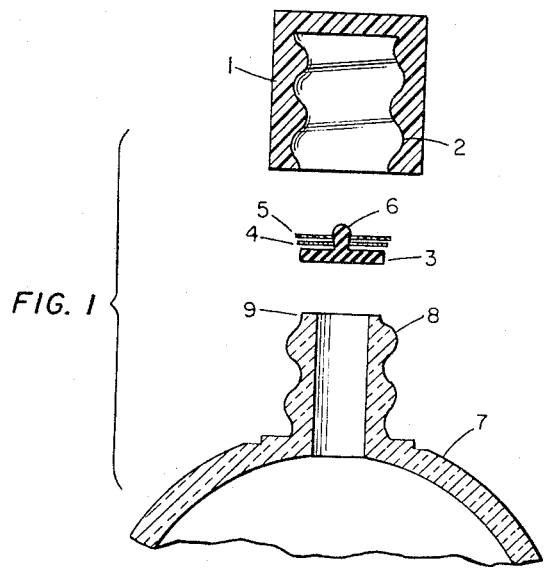
Figure 2A:
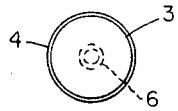
Figure 2B:
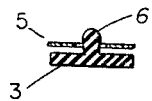
Figure 3:
Figure 4A:
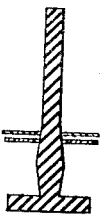
Figure 4B:
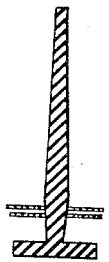
Figure 4C:
Figure 4D:
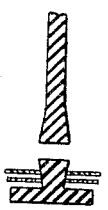

Oct. 11, 1966            E. P. ARTHUR            3,278,064

ART OF CLOSURES FOR CONTAINERS

Filed Oct. 9, 1963

INVENTOR

Edwin Peelle Arthur

United States Patent Office 3,278,064
Patented Oct. 11, 1966

3,278,064
ART OF CLOSURES FOR CONTAINERS
Edwin Peelle Arthur, Orange County, Calif.
(3110 Las Faldas Drive, Fullerton, Calif.)
Filed Oct. 9, 1963, Ser. No. 315,082
3 Claims. (Cl. 215—40)

This invention has to do with closures of containers and more particularly with an improved gasket for the sealing and resealing of screw finish glass bottles. It is one object of the invention to provide a tight seal for a glass container; which, once open, may then be easily and tightly resealed repeatedly. Further objects of the invention are: to provide a construction which may employ a variety of elastomeric materials, suited to the content of the container; to allow a gasket to be seated on the container lip and thereafter remain undisturbed as compression is applied; to maintain an effective seal even if, under compression, the sealed elastomeric gasket shall have taken a deformation or "set"; and to allow the safe relief of excessive pressure should same develop in the container; and further to allow easy and convenient application and use of my improvement with the conventional glass containers in screw finish style and the caps with which they are presently closed with respect to the general design.

The problem of closing containers is very old. A truly immense number of constructions have been employed. Before describing my improved device, and without pretending to the role of an historian, let me merely characterize the present state of the art as follows. Mechanical limitations of the molded screw finish of glass bottles and the screw cap, of whatever material, with which they are closed, requires a gasket or cap liner, as it is called. The cap liner must be fastened to the cap; otherwise it would fall out in handling. This is often done by application of an adhesive joining the cap liner to the cap. It may be done by friction. The liner is fabricated to an oversize. It wedges into the cap. To provide the combination of qualities needed for the linear, a laminated structure is often employed; wax impregnated paper, for example, to meet the container lip, is laid on a cork or fiber board which is thick enough and soft enough to accommodate the two mated elements—cap and container—and yield a seal.

In order to illustrate the novelty and utility of my improved devices, let me describe the action of the conventional closure such as mentioned above. With liner in place, as the screw cap is brought to seat on the screw finish glass container, the face (wax paper) starts to slide on the glass lip. After which, one or more of several alternatives will then ensue. The wax may stick on the lip. For a tight seal, then the liner adhesive may break and let the gasket turn with respect to the cap; or friction of the liner in the cap may be sufficient to yield a false seal; or the whole liner may "grind" to a seat between cap and lip. Or a combination of the actions may take place. Even if an effective first seal is obtained, the chances of an efficient re-seal are limited. Gaskets for effective seals should be pressed to position. Whereas the very nature of the usual screw seal is calculated to move the gasket by sliding friction while pressure is being applied.

In the face of these limitations, one might say very well wonder how any effective seals are obtained with the conventional construction now in general use. Some factors aid seals. For one, the lips of glass bottles are generally smooth; very smooth, in fact. Then too, for a large number of products, a truly tight seal is not imperative. But for a certain number of products, every single container of which must be well sealed; and especially for products in containers which are to be opened and then tightly resealed repeatedly, I have invented a novel and useful construction which I will explain by reference to the attached drawings of which the first is marked FIGURE I.

A cap 1 with internal threaded structure 2, encompasses an elastomeric sealing gasket 3 which is slightly smaller in diameter than the internal diameter of the threaded cap. At least one 4 and preferably two 5 relatively thin annular elements are held in loose juxtaposition of the sealing gasket 3 by a boss 6 shown as an integral part of said gasket here. Glass container 7 with screw finish threads 8 is illustrated to mate the cap 1 and effect a seal at the lip 9. Note carefully that the elements 4 and 5 or at least one of them, is as large in diameter as the pitch diameter of the cap threads 2 thus effectively holding the assembly in the cap for easy handling. They screw into the cap in process of assembly.

In sealing, the gasket 3 meets lip 9 and thereafter is under no stress to cause movement other than compression. Rotary motion of the cap is accommodated by the sliding of elements 4 and 5 and a pivot on the boss 6 until a neat firm seat is complete on the lip 9 as illustrated in FIGURE II which shows one form of deformation of the assembly whereby a tight seal is assured. Resealing is certain and easy after the original seal is broken. Backing off the cap develops no tendency to tear the surface of the gasket 3 but only to relieve compression. Hence repeated re-sealing does no mechanical damage to the gasket.

Even a single annular element 4 sliding on the cap 1 will accomplish my purposes after a fashion. Moreover, I may elect to form element 5 as a dished spring so that element 5 as a spring really makes the seal rather than a limit on compression of the gasket 3. In this way, any permanent set or creep of the gasket elastomer is accommodated. Moreover, such a construction will allow any excessive internal pressure in the container to be harmlessly vented. Features of such a construction are shown in FIGURE III.

All persons skilled in the art will at once appreciate the fact that my improved construction permits the use of materials suited to the various service demands without compromise. For example, a soft silicone rubber may be used for the sealing gasket. There is no tendency to tear it with my invention. Also thin strong and flexible polymers may be used for the annular sliding elements; where low coefficient of friction with respect to the cap is much less than the coefficient of friction of the gasket with respect to the lip of the container.

In FIGURE IV I show the intermediate steps in forming and a possible assembly of the gasket 3 where a simple shearing forms boss 6 after elements 4 and 5 have been positioned. Notwithstanding the simplicity of my invention, I ask nevertheless that the novelty and utility be considered broadly in the light of the prior art and that at least one or more of the following claims be allowed to define my improved construction for an improvement in the closures of screw cap containers.

What I claim is:

1. A screw cap container closure comprising a threaded cap, a multiple element gasket assembly in flexible juxtapositon within said cap; and of said elements, that one forming a seal on the lip of said container not substantially larger in diameter than the inside diameter of said threads of said cap, and more elastomeric, exhibiting a relatively higher coefficient of friction with respect to said container lip than other elements of said gasket assembly are to said cap; and at least one of the other elements at least as large in diameter as the pitch diameter of said threads of said threaded cap.

2. A screw cap container closure as described in claim 1, at least one element of which is in form of a dished spring.

3. A screw cap container closure as described in claim 1, wherein an extension of one element holds at least one other to allow an axial relative movement of the two in sealing.

References Cited by the Examiner

UNITED STATES PATENTS

| | | | |
|---|---|---|---|
| 1,984,752 | 12/1934 | McManus | 215—39 |
| 2,200,600 | 5/1940 | Grapp | 215—29 |
| 2,716,504 | 8/1955 | Martin | 215—40 |
| 2,728,475 | 12/1955 | Teeters et al. | 215—40 |
| 2,866,570 | 12/1958 | Powell | 215—40 |

FOREIGN PATENTS 540,000   10/1941   Great Britain.

THERON E. CONDON, *Primary Examiner.*

FRANKLIN T. GARRETT, *Examiner.*

J. B. MARBERT, *Assistant Examiner.*